US012106886B2

(12) United States Patent
Sakamoto

(10) Patent No.: US 12,106,886 B2
(45) Date of Patent: Oct. 1, 2024

(54) REACTOR STRUCTURE

(71) Applicant: Mitsubishi Electric Corporation, Tokyo (JP)

(72) Inventor: Tatsuro Sakamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 831 days.

(21) Appl. No.: 17/072,118

(22) Filed: Oct. 16, 2020

(65) Prior Publication Data

US 2021/0166863 A1 Jun. 3, 2021

(30) Foreign Application Priority Data

Nov. 28, 2019 (JP) ................................ 2019-214820

(51) Int. Cl.

| | |
|---|---|
| ***H01F 27/28*** | (2006.01) |
| ***H01F 1/147*** | (2006.01) |
| ***H01F 27/24*** | (2006.01) |
| ***H01F 27/32*** | (2006.01) |

(52) U.S. Cl.

CPC ..... *H01F 27/2876* (2013.01); *H01F 1/14791* (2013.01); *H01F 27/24* (2013.01); *H01F 27/327* (2013.01)

(58) Field of Classification Search

CPC .. H01F 27/2876; H01F 1/14791; H01F 27/24; H01F 27/327; H01F 27/22; H01F 37/00; H01F 27/08; H01F 27/306

See application file for complete search history.

(56) References Cited

U.S. PATENT DOCUMENTS 5,469,124 A * 11/1995 O'Donnell .............. H01F 27/06 336/61
2010/0209314 A1* 8/2010 Sato ........................ H01F 37/00 422/198
2013/0099883 A1* 4/2013 Sato ........................ H01F 27/22 336/55
2016/0343490 A1 11/2016 Maeno et al.
(Continued)

FOREIGN PATENT DOCUMENTS

JP 61152004 A * 7/1986
JP 2007281186 A * 10/2007
(Continued)

OTHER PUBLICATIONS

Communication dated Sep. 14, 2021 from the Japanese Patent Office in Application No. 2019-214820.
(Continued)

*Primary Examiner* — Tuyen T Nguyen
(74) *Attorney, Agent, or Firm* — Sughrue Mion, PLLC; Richard C. Turner

(57) ABSTRACT

An object is to increase an inductance value without blocking a leakage magnetic flux and improve cooling performance by directly cooling a coil and a core by a cooler via cooling members. Winding cooling portions for cooling the coil are in contact with a cooler via coil cooling members formed by non-fluid material, core cooling portions for cooling the core are in contact with the cooler via core cooling members formed by non-fluid material, and a resin mold member covering the coil and the core retains the coil and the core and fixes the coil and the core to the cooler.

21 Claims, 11 Drawing Sheets

(56) References Cited

U.S. PATENT DOCUMENTS

| | | | |
|---|---|---|---|
| 2019/0206615 A1 | 7/2019 | Suzuki | |
| 2020/0118728 A1 | 4/2020 | Inaba et al. | |

FOREIGN PATENT DOCUMENTS

| | | | |
|---|---|---|---|
| JP | 2014-154757 | A | 8/2014 |
| JP | 2016219633 | A | 12/2016 |
| JP | 2017174884 | A | 9/2017 |
| JP | 201860831 | A | 4/2018 |
| JP | 2018195786 | A | 12/2018 |
| JP | 2019-106515 | A | 6/2019 |
| JP | 2019-121665 | A | 7/2019 |

OTHER PUBLICATIONS

Communication dated Dec. 22, 2020, from the Japanese Patent Office in Application No. 2019-214820.
Office Action dated May 11, 2021 from the Japanese Patent Office in JP Application No. 2019-214820.
Communication dated Jun. 25, 2024, issued in Chinese Application No. 202011313831.6.

* cited by examiner

REACTOR STRUCTURE

BACKGROUND OF THE INVENTION

Field of the Invention

The present disclosure relates to a reactor structure.

Description of the Background Art

For example, an electric vehicle such as an electric car or a plug-in hybrid vehicle has a power conversion device for driving a motor using power from a high-voltage battery as motive power. In the power conversion device, a reactor is used for various purposes such as smoothing power or stepping up/down voltage.

In a reactor of a power conversion device for an electric vehicle that requires large power density, loss density is large and forced cooling is performed by using a filler such as a potting material. Here, the loss is loss in the reactor, and specifically, refers to loss occurring in a winding and a core forming the reactor.

One of conventional reactors includes: a reactor body having a core and a coil mounted onto the core; a case storing the reactor body and having an opening through which a part of the reactor body protrudes to the outside; a bus bar which is a conductive member electrically connected to the coil and covers a part of a side surface of the reactor body protruding from the opening; and a terminal block having an extending portion provided along an edge of the opening and formed by a resin material in which a part of the bus bar is embedded, the terminal block supporting a part electrically connecting the bus bar and the outside (see Patent Document 1).

In Patent Document 1, the following configuration is often adopted. That is, the core and the coil are mounted onto the case or the like having a dug part for preventing the filler from flowing, and the filler is poured and solidified. Then, the case is attached to a cooler of the power conversion device, and thus the coil and the core which are heat generating bodies are cooled by the cooler via the filler and the case.

Patent Document 1: Japanese Laid-Open Patent Publication No. 2019-121665

The size of the reactor is restricted by factors due to heat dissipation property and loss. In order to downsize the reactor, it is necessary to improve heat dissipation property and reduce loss. Factors influencing loss include ripple current. In order to reduce loss, it is necessary to increase the inductance value and thus reduce ripple current. However, in general, it is necessary to enlarge the size of the reactor in order to increase the inductance value. Meanwhile, in order to improve the heat dissipation property, it is conceivable that the case is made of metal and the coil and the core which are heat generating bodies are located as close to the case as possible so that the thermal resistance is reduced. However, the metal member blocks a leakage magnetic flux of the reactor, so that the inductance value is reduced, and loss is increased.

SUMMARY OF THE INVENTION

The present disclosure has been made to solve the above problem, and an object of the present disclosure is to provide a reactor structure that increases an inductance value without blocking a leakage magnetic flux and improves cooling performance by directly cooling a coil and a core by a cooler via a cooling member.

A reactor structure according to the present disclosure has a core wound by a coil, a winding cooling portion for cooling the coil is in contact with a cooler via a coil cooling member formed by non-fluid material, a core cooling portion for cooling the core is in contact with the cooler via a core cooling member formed by non-fluid material, and a resin mold member covering the coil and the core retains the coil and the core and fixes the coil and the core to the cooler.

The reactor structure according to the present disclosure can increase the inductance value without blocking the leakage magnetic flux and improve cooling performance by directly cooling the coil and the core by the cooler via the cooling member.

DESCRIPTION OF THE PREFERRED EMBODIMENTS

Embodiment 1

Figure 1:
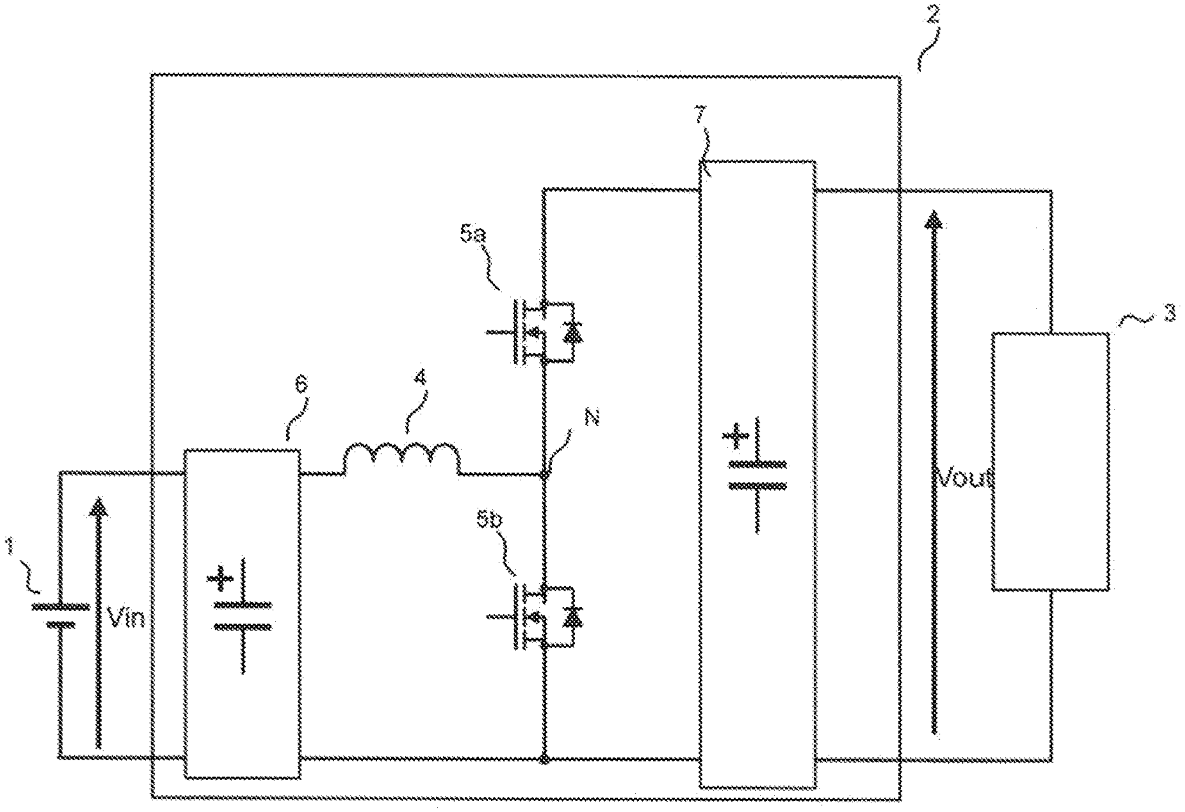
FIG. 1 is a schematic diagram showing the configuration of a power conversion device according to embodiment 1.

Hereinafter, a power conversion device according to the present embodiment will be described with reference to the drawings. In the drawings, the same or corresponding parts are denoted by the same reference characters, and will not be repeatedly described. The present embodiment aims to achieve size reduction and cost reduction of a reactor used in a power conversion device. FIG. 1 is a schematic diagram showing the configuration of the power conversion device according to embodiment 1. In FIG. 1, the power conversion device 2 is a single-switch-type boost DC/DC converter which boosts the voltage of DC power from a DC input power supply 1 and supplies the power to a load 3.

The power conversion device 2 includes a boost reactor 4, semiconductor switching elements 5*a*, 5*b*, an input power smoothing capacitor 6, and an output power smoothing capacitor 7. The semiconductor switching elements 5*a*, 5*b* are connected in series to each other, and a connection point (neutral point) N therebetween is connected to one terminal of a winding of the boost reactor 4. Another terminal of the winding of the boost reactor 4 on the side that is not connected to the connection point N between the semiconductor switching elements 5*a*, 5*b* is connected to a positive terminal of the input power smoothing capacitor 6. A terminal of the semiconductor switching element 5*a* on the side that is not connected to the neutral point N is connected to a positive terminal of the output power smoothing capacitor 7. A terminal of the semiconductor switching element 5*b* on the side that is not connected to the neutral point N is connected to a cathode terminal of the output power smoothing capacitor 7 and a cathode terminal of the input power smoothing capacitor 6.

By switching operations of the semiconductor switching elements 5*a*, 5*b*, the boost reactor 4 repeatedly stores/discharges electric energy as magnetic energy, whereby boosting operation is performed. Here, the operation principle of the boost DC/DC converter is commonly well-known, and therefore the description thereof is omitted.

Figure 2:
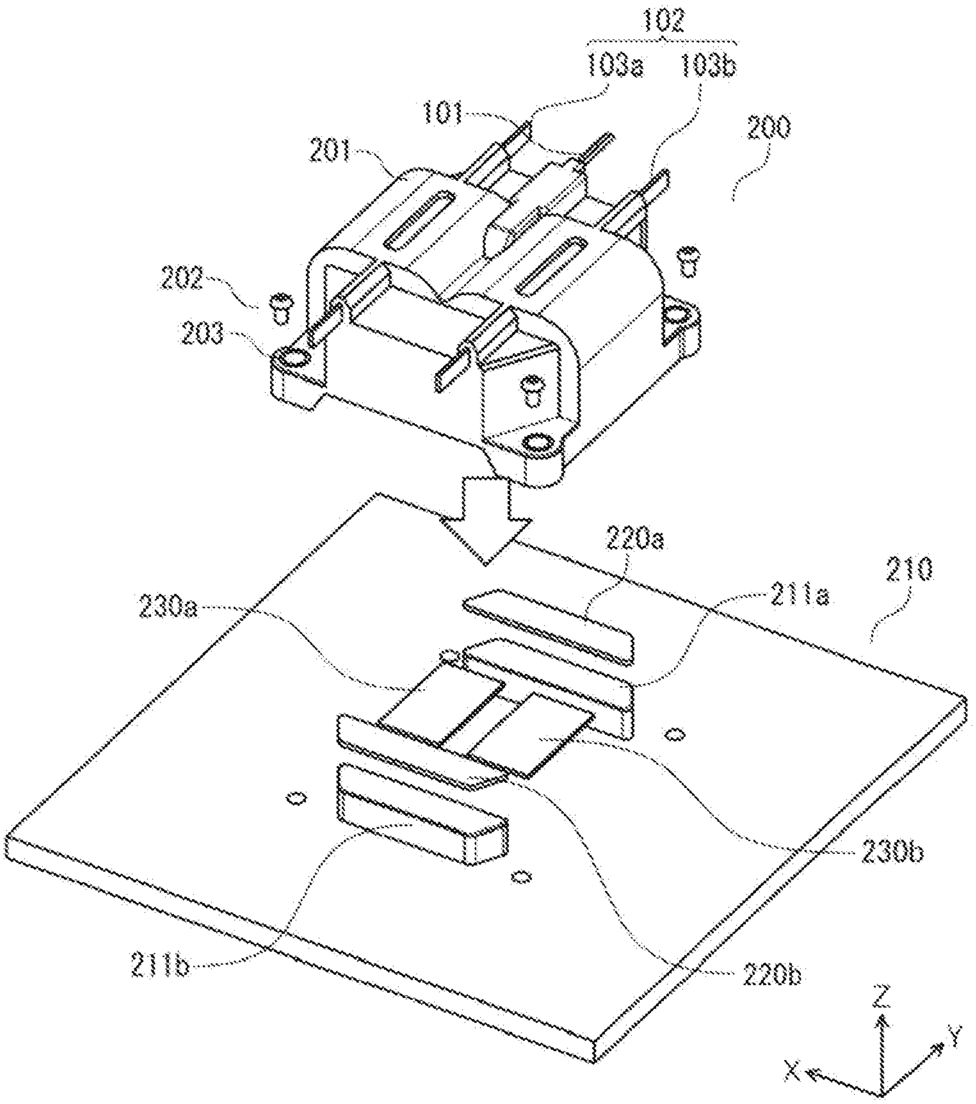
FIG. 2 is an exploded perspective view showing a reactor structure according to embodiment 1.

FIG. 2 is an exploded perspective view showing the structure of the boost reactor 4. In FIG. 2, the boost reactor 4 includes a boost reactor body 200, a cooler 210, core cooling members 220*a*, 220*b*, and coil cooling members 230*a*, 230*b*. The boost reactor body 200 includes a thermistor 101, a coil 102, a resin mold member 201, screws 202, and screw holes 203.

Figure 3:
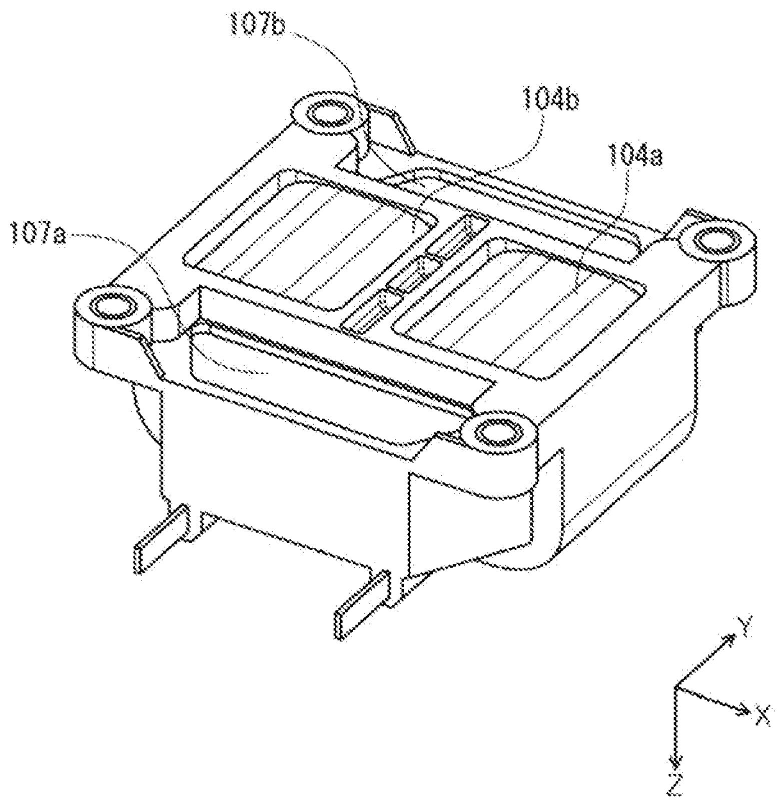
FIG. 3 is a perspective view showing the structure of a reactor body according to embodiment 1.
Figure 4:
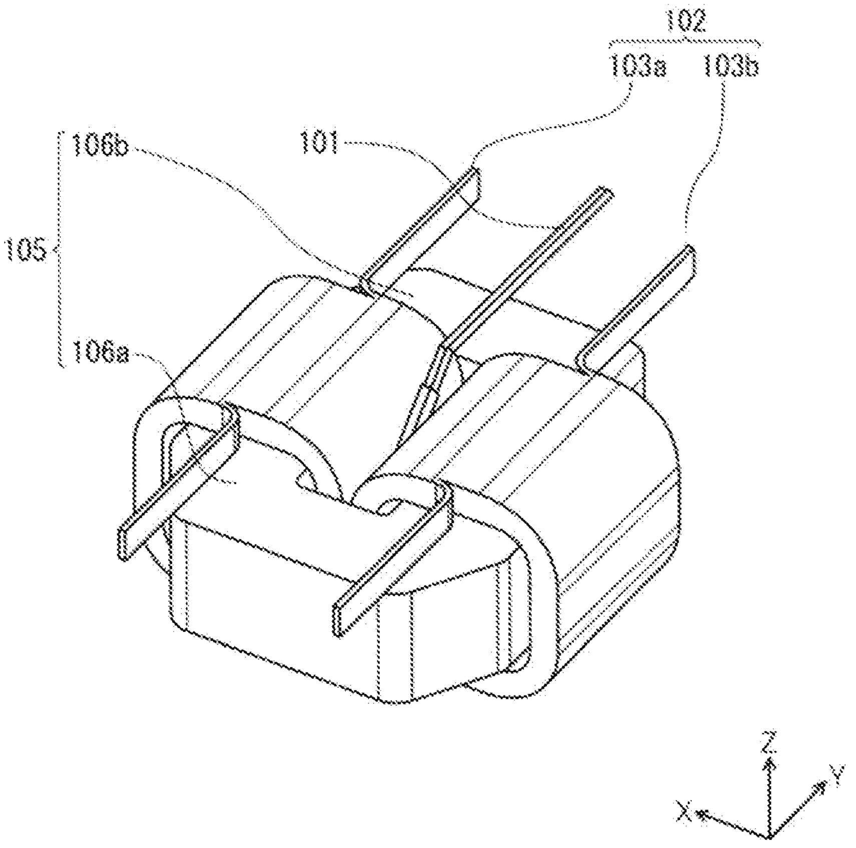
FIG. 4 is a perspective view showing the structure of the reactor body according to embodiment 1.

FIG. 3 and FIG. 4 are perspective views showing the structure of the boost reactor body. FIG. 3 is a perspective view seen from below side, and FIG. 4 is a perspective view seen from above side. In FIG. 2, the arrow direction of Z axis is defined as upper side, and the side opposite to the arrow direction is defined as lower side. X axis and Y axis are axes extending in directions perpendicular to Z axis. FIG. 4 shows the state in which the resin mold member 201 is removed from the boost reactor body 200. In the drawing, the boost reactor body 200 is formed by the resin mold member 201 covering the thermistor 101, the coil 102, and the core 105.

Two windings 103*a*, 103*b* forming the coil 102 have ends connected to each other at the outside, and other ends serving as terminals of the boost reactor 4. The windings 103*a*, 103*b* are wound around the core 105, and the turns ratio thereof is one to one. The windings 103*a*, 103*b* are wound such that magnetic fluxes generated from the respective windings 103*a*, 103*b* are directed in the same direction inside the core 105 (cumulative connection).

Figure 5:
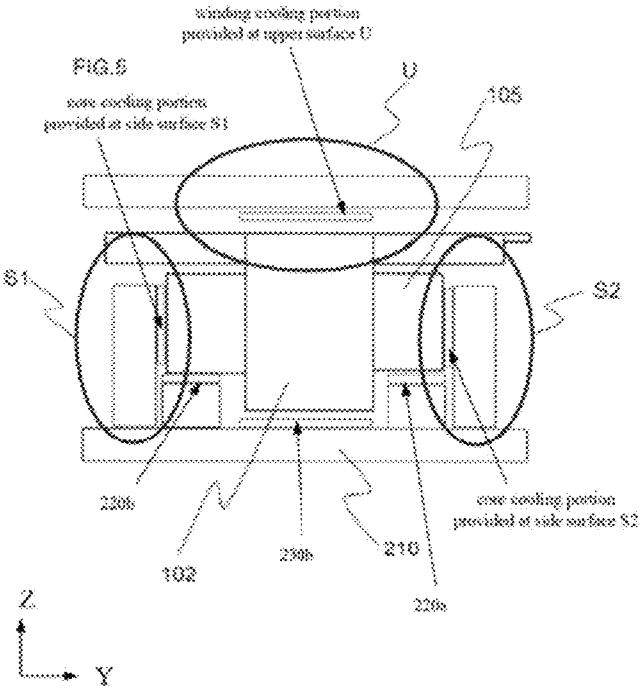
FIG. 5 is a sectional view showing a reactor according to embodiment 1.

The resin mold member 201 serves to retain the thermistor 101, the coil 102, and the core 105 and also to fix the boost reactor body 200 to the cooler 210. As shown in FIG. 3, winding cooling portions 104*a*, 104*b* for cooling the coil 102 and core cooling portions 107*a*, 107*b* for cooling the core 105 are provided, and these portions are not covered by a resin mold. Other part that is not covered by a resin mold may be provided, unless the function is lost. Although the winding cooling portions 104*a*, 104*b* and the core cooling portions 107*a*, 107*b* are located on the lower side of the reactor, their locations are not limited thereto. For example, as shown in FIG. 5, they may be provided at an upper part U or side surfaces S1, S2 of the reactor. Cooling portions may be provided at appropriate parts in accordance with the shapes of the reactor and the cooler 210, whereby cooling performance can be enhanced.

The winding cooling portions 104*a*, 104*b* and the core cooling portions 107*a*, 107*b* are in contact with the cooler 210 via the core cooling members 220*a*, 220*b* and the coil cooling members 230*a*, 230*b*, respectively. The core cooling members 220*a*, 220*b* and the coil cooling members 230*a*, 230*b* are formed as members separate from each other. However, without limitation thereto, they may be integrated into one cooling member. As shown in FIG. 2, the cooler 210 is provided with bases 211*a*, 211*b* for mounting the core cooling members 220*a*, 220*b* thereon.

The material of the cooling members forming the core cooling members 220*a*, 220*b* and the coil cooling members 230*a*, 230*b* is a non-fluid material such as a semisolid or a solid. Examples thereof include a silicone-type heat dissipation sheet, a curable silicone-type gap filler, and heat dissipation grease. By using such a non-fluid material, it becomes unnecessary to provide a dug structure for preventing a cooling member from flowing, which would be needed in the case of using a fluid material (potting). Since the dug structure is eliminated, metal members for covering side surfaces of the reactor are not provided, and thus the inductance increases, whereby size reduction of the reactor can be achieved.

Figure 6:
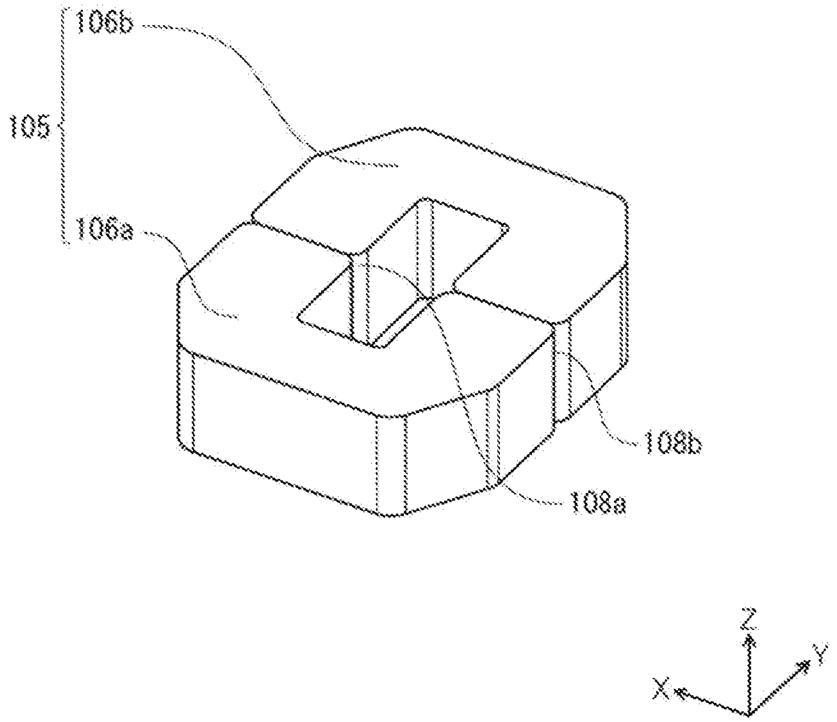
FIG. 6 is a perspective view showing the structure of a core of the reactor according to embodiment 1.

FIG. 6 is a perspective view showing the structure of the core 105 of the boost reactor 4. The core 105 is formed by two core members 106*a*, 106*b*, and their respective ends are in contact with each other at core member end abutting portions 108*a*, 108*b*. In this state, the resin mold member 201 fixes the core 105. Here, an example in which the core 105 is formed by two core members has been shown, but the structure thereof is not limited thereto.

Hereinafter, a problem in a boost reactor having a comparative structure will be described. Induced voltage is generated in accordance with change in current in the reactor, and the ratio of the change in current and the induced voltage is self-inductance L. In the power conversion device 2, in the boost reactor 4 during boost operation, induced voltage is determined by input voltages Vin, Vout for each operation mode, and thus ripple current depending on the self-inductance L occurs.

Increase in ripple current leads to increase in winding loss of the boost reactor 4. And increase in ripple current leads to increase in loss in the input power smoothing capacitor 6, the output power smoothing capacitor 7, and the semiconductor switching elements 5*a*, 5*b*.

That is, regarding the relationship between ripple current and winding loss, loss occurring in the winding is separated into DC loss due to a DC current component and AC loss due to a ripple component. Where the AC loss is Wcoil_ac [W], the winding resistance is Rcoil [Ω], and the ripple current value is Irip [Arms], the AC loss Wcoil_ac [W] is represented by the following Expression (1).

$$\mathrm{Wcoil\_ac} = \mathrm{Irip}^2 \times \mathrm{Rcoil} \ldots \quad (1)$$

Thus, the AC loss is proportional to the square of the ripple current value and therefore increase in the ripple current leads to increase in loss.

Meanwhile, regarding the input power smoothing capacitor 6 and the output power smoothing capacitor 7, where loss occurring in the capacitor is Wco [W], a resistance component of the capacitor is ESRco [Ω], and current flowing through the capacitor is Ico [Arms], the capacitor loss is represented by the following Expression (2).

$$\mathrm{Wco} = \mathrm{Ico}^2 \times \mathrm{ESRco} \ldots \quad (2)$$

In both of the input power smoothing capacitor 6 and the output power smoothing capacitor 7, current Ico flowing through the capacitor increases corresponding to increase in the ripple current of the reactor. Therefore, if the ripple current increases, loss in each capacitor increases.

Also regarding the semiconductor switching element, similarly to the above, if the ripple current of the reactor increases, ripple of current flowing through the semiconductor switching element increases, so that loss in a member forming the semiconductor switching element increases.

As understood from the above description, from the viewpoint of loss and heat generation, it is desirable that the self-inductance L is increased and the ripple current is decreased.

The inductance value L of the reactor is represented by the following Expression (3).

$$L=N^2\times(\mu r\cdot\mu_0\cdot s)/lc\ \ldots \quad (3)$$

Here, lc is a core magnetic path length, μr is relative permeability of the core, and $\mu_0$ is vacuum permeability.

In order to increase the inductance L, a method of increasing the number N of turns of the coil or increasing a core sectional area S is commonly adopted.

Main factors that restrict the size of the reactor are heat dissipation property and loss. In order to reduce the size of the reactor, it is desirable that the amount of loss is reduced while the inductance value is increased. However, when increasing the inductance value by the above method, there is a problem that the size of the reactor is enlarged and thus size reduction is limited.

Figure 7:
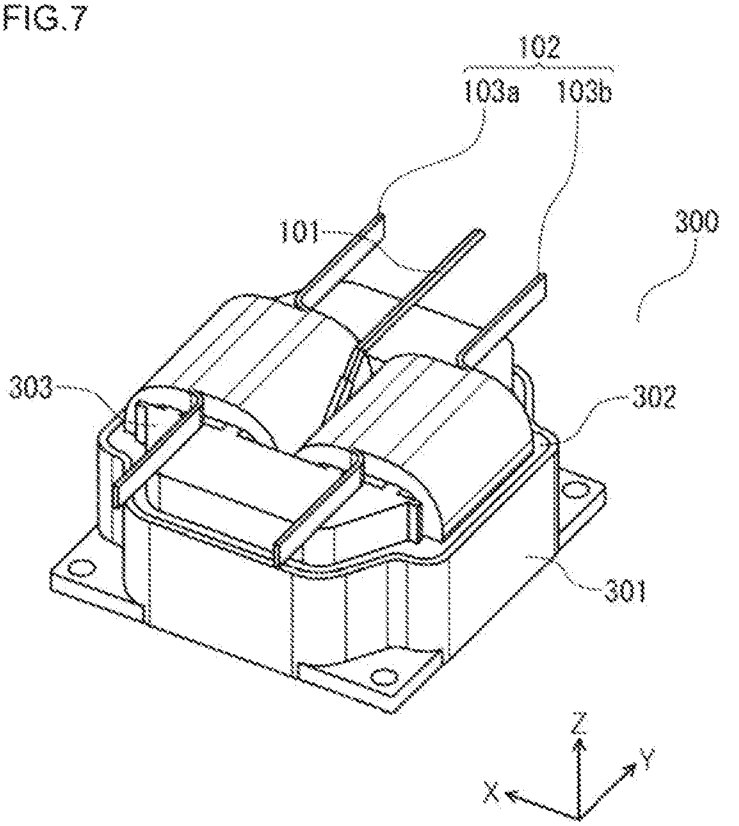
FIG. 7 is a perspective view showing the structure of a comparative reactor.

FIG. 7 is a perspective view showing the structure of a comparative boost reactor. In FIG. 7, a coil and a core of a boost reactor body 300 are the same as those of the boost reactor body 200 shown in FIG. 2. In FIG. 7, the boost reactor body 300 includes the thermistor 101, the coil 102, a case 301, a filler 302, and a core mold member 303.

The core mold member 303 covers the core and serves to protect the core surface and position the coil 102. The filler 302 is, for example, formed by a silicone-type potting material, and serves to cool the coil 102 and the core and fix the core. The case 301 serves to prevent the filler 302 from flowing out.

In order to improve heat dissipation property, the case 301 is made of a metal member such as aluminum and is provided to be close to the coil 102 and the core which are heat generating bodies. When a metal member is present close to the reactor, the metal member blocks a leakage magnetic flux generated from the reactor. Here, the leakage magnetic flux is a magnetic flux emitted directly to a space from the core or the coil of the reactor. The leakage magnetic flux also contributes to the inductance value, and when the leakage magnetic flux decreases, the self-inductance value decreases. Therefore, while heat dissipation performance is improved owing to the case 301, there is a problem that the amount of loss in the reactor increases.

The present embodiment has been made to solve such a problem, and in the boost reactor 4 of the power conversion device 2 according to the present embodiment, a resin member is used for a mechanism for retaining the reactor while high heat dissipation property is maintained. Thus, a large amount of leakage magnetic flux can be utilized. As a result, it is possible to increase the inductance value without changing the structures of the coil and the core. Further, loss in the reactor is reduced, size reduction thereof is achieved, and production thereof can be performed at low cost.

Figure 8:
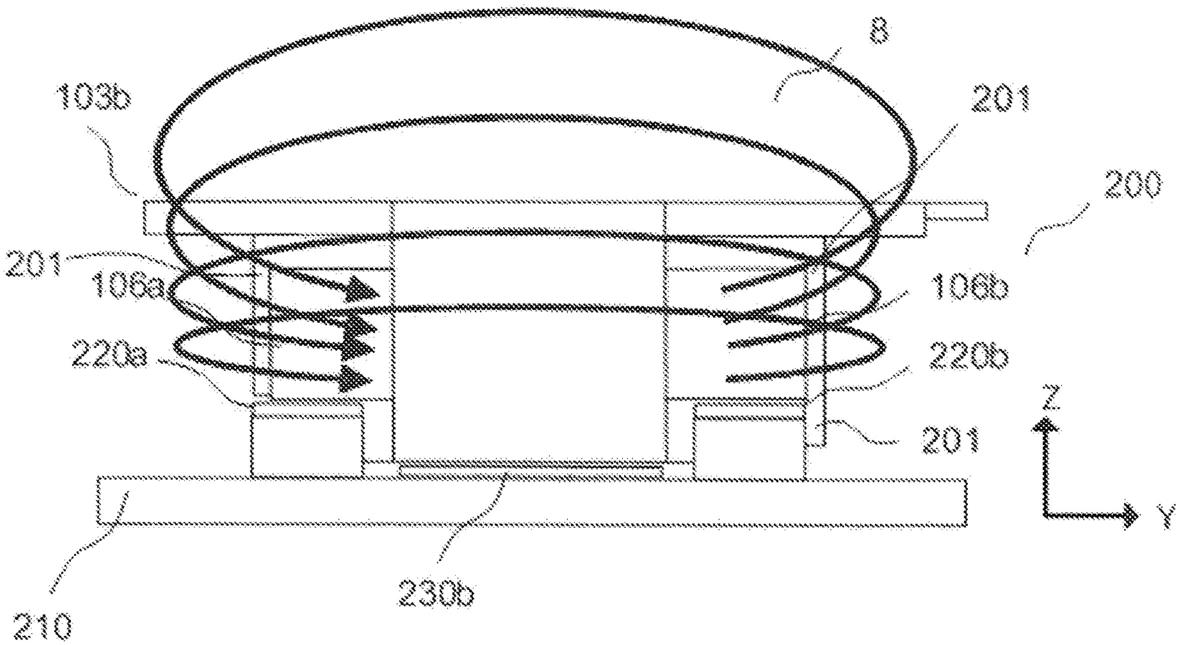
FIG. 8 is a sectional view of the reactor according to embodiment 1, along a plane perpendicular to an X-axis direction.
Figure 9:
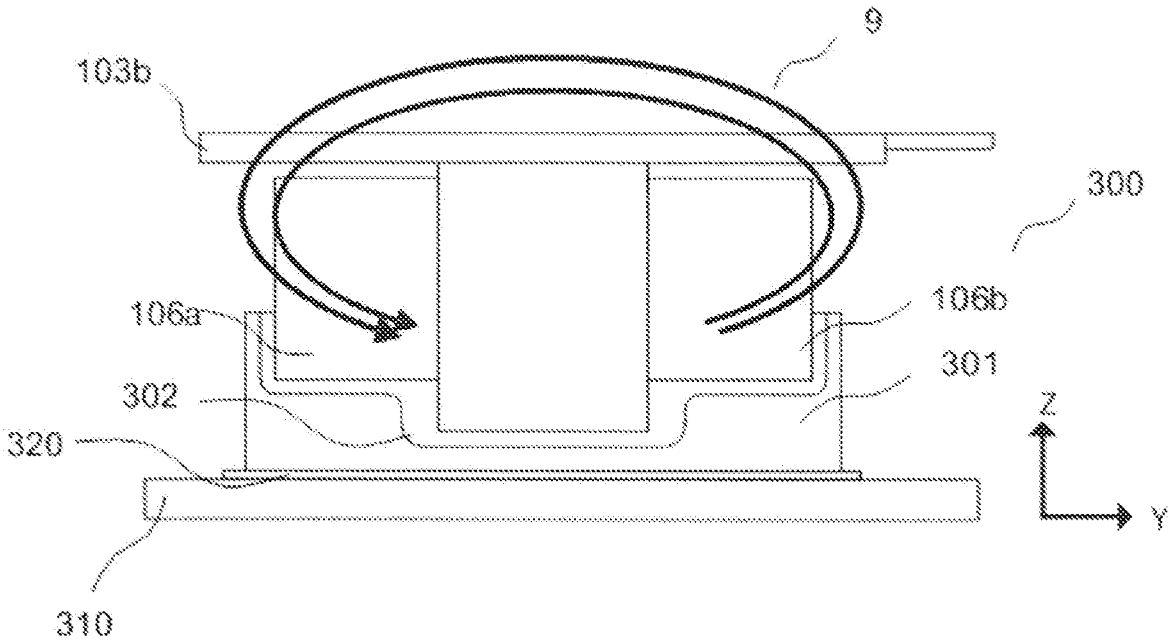
FIG. 9 is a sectional view showing a comparative reactor structure, along a plane perpendicular to the X-axis direction.

Hereinafter, the effects of the boost reactor 4 of the power conversion device according to the present embodiment will be described. FIG. 8 is a sectional view of the boost reactor according to the present embodiment, along a plane perpendicular to the X-axis direction. FIG. 9 is a sectional view showing a comparative boost reactor structure, along a plane perpendicular to the X-axis direction.

In FIG. 9, in the comparative boost reactor, since the filler 302 serves to fix the coil and the core, the reactor needs to be covered, including side surfaces thereof, by the metal case 301. Therefore, with regard to the leakage magnetic flux 9 generated from the coil and the core, a leakage magnetic flux in the Y-axis direction is blocked by the case 301.

On the other hand, in FIG. 8, in the boost reactor according to the present embodiment, the boost reactor body 200 is fixed by the resin mold member 201, whereby a function for fixing to the cooling members can be eliminated and thus cooling surfaces can be localized. That is, in the present embodiment, as shown in FIG. 8, cooling surfaces are only three surfaces of the core cooling members 220*a*, 220*b* and the coil cooling member 230*b*, and thus the cooling surfaces can be localized. To the contrary, in FIG. 9, the entire surface of the filler 302 is a cooling surface. Therefore, the cooling surface includes not only the bottom surfaces of the coil 102 and the core 106 but also side surfaces of the coil 102 and the core 106, so that the cooling surface cannot be localized. Accordingly, in the present embodiment, a metal case for covering side surfaces of the reactor is not needed. Therefore, the leakage magnetic flux 8 generated from the coil and the core can spread also in the Y-axis direction and thus the magnetic flux amount thereof is larger than the amount of the leakage magnetic flux 9 shown in FIG. 9, so that the inductance value increases. In the present embodiment, the core, the coil, and the like are fixed to the cooler 210 by a fixation portion that the resin mold member 201 has.

In the comparative boost reactor, the coil and the core are cooled by a cooler 310 via the filler 302, the case 301, and heat generation grease 320. On the other hand, the coil 102 and the core 105 of the boost reactor 4 according to the present embodiment are directly cooled by the cooler 210 via the coil cooling members 230*a*, 230*b* and the core cooling members 220*a*, 220*b*, respectively. Thus, the thermal resistance to reach the cooler 210 can be reduced, so that cooling performance is improved.

Further, since a metal case is not needed, the reactor body can be downsized and production can be performed at low cost.

In the power conversion device 2, when a housing or a housing-like large metal member such as a bus bar covering one surface of the reactor is located close to the boost reactor 4, the effects of the present embodiment are influenced. In order to sufficiently obtain the effects of the present embodiment, it is necessary to ensure an area in which a leakage magnetic flux can be generated. It is preferable to, except for the surface having the cooling portion, ensure a space of at least 10 mm from ends of the core and the coil which are magnetic flux generation sources, i.e., separate the large metal member from ends of the core and the coil by at least 10 mm. It is noted that influence of a small metal member such as a screw for tightening the terminal block or the like can be neglected.

As shown in FIG. 7, the core of the comparative boost reactor is fixed by the filler 302. Since the hardness of the filler is small, it is impossible to fix the core member end abutting portions 108*a*, 108*b* of the core members 106*a*, 106*b* while being in contact with each other by the filler 302 alone. Therefore, it is necessary to fix the core member end abutting portions 108*a*, 108*b* by an adhesive agent.

On the other hand, in the boost reactor 4 according to the present embodiment, molding is performed by the resin mold member 201 in a state in which the ends of the core members 106*a*, 106*b* abut on each other. Thus, stress due to thermal compression generated during molding can be continued to be applied, whereby the core member end abutting portions 108a, 108b can be fixed in a state in which they are abutting on each other. In the comparative boost reactor, since an adhesive agent is used, there is a risk that, when the temperature increases, the adhesive agent is disabled, so that the reactor is disabled. However, in the boost reactor 4 according to the present embodiment, such a risk is eliminated. Accordingly, the reactor can be operated even at a higher temperature, and size reduction in the reactor can be achieved.

As the core of the boost reactor according to the present embodiment, a dust core may be used. The dust core exhibits a great saturation magnetic flux density and is suitable for large power application, but has comparatively small permeability. Therefore, the ratio of an inductance value due to a leakage magnetic flux increases relative to an inductance value generated by the core, whereby a great inductance increase effect is obtained. In particular, when using Sendust which is a dust core having small relative permeability, a significant effect can be obtained. However, application of the present embodiment is not limited thereto. A material such as an electromagnetic steel sheet or a ferrite having high relative permeability may be used as the core. This provides the same effects as those described above.

Figure 10:
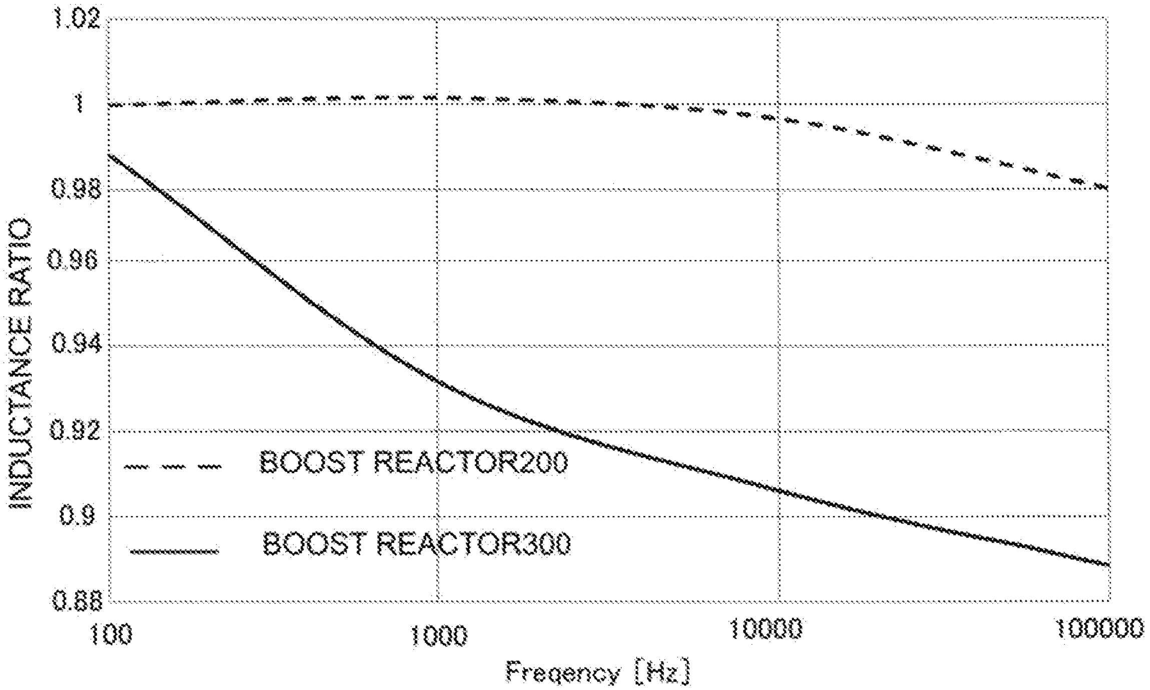
FIG. 10 is a graph showing the relationship between the inductance value and the frequency.

FIG. 10 is a graph showing the relationship between the inductance value and the frequency, and shows comparison between the inductance values of the boost reactor of the present embodiment and the comparative boost reactor. In FIG. 10, the horizontal axis indicates the frequency, the vertical axis indicates the ratio of the inductance relative to the inductance of the boost reactor of the present embodiment at 100 Hz, a dotted line represents the boost reactor of the present embodiment, and a solid line represents the comparative boost reactor. Block of a leakage magnetic flux by the metal member is due to eddy current occurring in a metal housing, and greatly varies with accordance to the frequency (magnetic flux change amount). That is, as the frequency becomes higher, the magnetic flux block effect increases. As shown in FIG. 10, in particular, when the drive frequency for the semiconductor switching elements 5a, 5b of the power conversion device 2 is 1 kHz or higher, reduction in the inductance in the present embodiment is small, but the reduction rate in the comparative boost reactor is large. As an example of the small reduction in inductance at higher than 1 kHz, the inductance value of the reactor structure at drive frequencies from 1,000 Hz to 100,000 Hz is within 0.98 of the inductance value at 100 Hz (see the dotted line in FIG. 10). Therefore, the present embodiment provides particularly significant effects when the drive frequency of the power conversion device is 1 kHz or higher.

As described above, in the present embodiment, a structure that allows a large amount of leakage magnetic flux to be utilized while keeping high heat dissipation property, is used. Whereby it is possible to increase the inductance value so as to reduce loss, without changing the material and the structure of the coil and the core. That is, in the reactor structure according to the present embodiment, the resin member is used for the mechanism for retaining the reactor. Whereby it is possible to increase the inductance value without blocking the leakage magnetic flux. In addition, the coil and the core can be directly cooled by the cooler via the cooling members, whereby cooling performance can be improved. Further, size reduction of the reactor structure can be achieved and production can be performed at low cost.

Embodiment 2

In the above description, the boost reactor body 200 of the power conversion device is configured such that the two windings 103a, 103b are cumulatively connected to form one coil. The cumulative connection is based on the premise that a magnetic path is formed inside the core. On the other hand, in the case of being applied to the power conversion device and the reactor configuration based on the premise that a magnetic path is formed outside the core and the leakage magnetic flux is utilized as inductance, higher effects are provided. That is, the inductance value can be further increased. In the reactor based on the premise that the leakage magnetic flux is utilized as inductance, the absolute amount of the leakage magnetic flux is large, and the ratio of the inductance value based thereon with respect to the inductance value generated by the core becomes large. Therefore, the leakage magnetic flux increase effect obtained in the present embodiment is relatively large.

Figure 11:
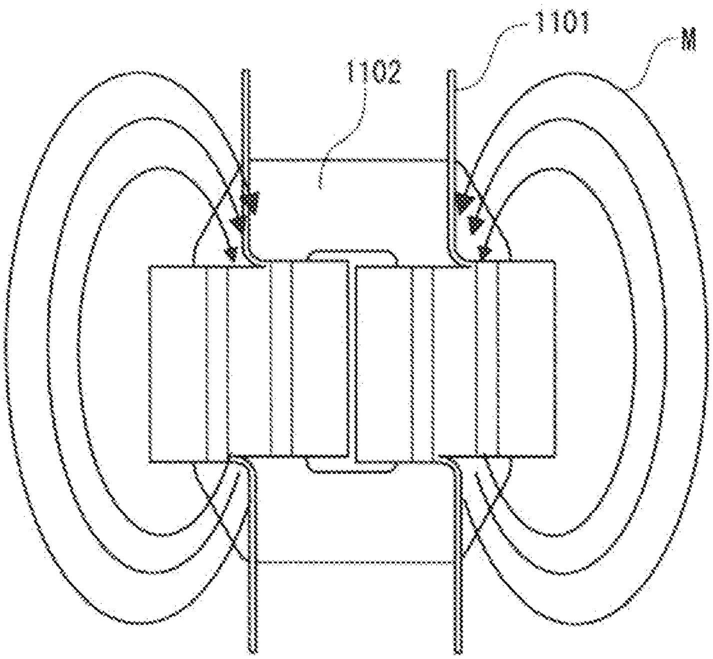
FIG. 11 is a side view showing the case in which a magnetically coupled reactor is used as a reactor according to embodiment 2.

An example of such a power conversion device is a multiphase boost converter formed by a boost reactor having a plurality of windings. Further, an example of such a boost reactor is a magnetically coupled reactor in which magnetic fluxes generated from the respective windings are canceled out (differential connection). FIG. 11 is a side view showing the case in which the magnetically coupled reactor is used as the boost reactor. In FIG. 11, a coil 1101 is wound around a core 1102, and a magnetic flux M is generated. It is noted that the positional relationship between: the cooling member, the cooler, and the resin mold member; and the core 1102 and the coil 1101, is the same as that shown in embodiment 1.

In the above embodiments, a boost DC/DC converter has been shown as the circuit configuration of the power conversion device. However, this is merely an example, and the power conversion device may be configured by other circuit such as an AC/DC converter circuit or an insulation-type step-down DC/DC converter circuit. Also in this case, the same effects as described above are obtained.

In addition, the number, dimensions, materials, and the like of the components described above may be changed appropriately.

Although the disclosure is described above in terms of various exemplary embodiments and implementations, it should be understood that the various features, aspects, and functionality described in one or more of the individual embodiments are not limited in their applicability to the particular embodiment with which they are described, but they can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A reactor structure comprising a core wound by a coil, wherein a winding cooling portion for cooling the coil is in contact with a cooler via a coil cooling member formed by non-fluid material, a core cooling portion for cooling the core is in contact with the cooler via a core cooling member formed by a non-fluid material, a resin mold member covering the coil and the core retains the coil and the core and fixes the coil and the core to the cooler, and the core cooling portion comprises a first core cooling portion provided at a first side surface and a second core cooling portion provided at a second side surface facing opposite to the first side surface.

2. The reactor structure according to claim 1, wherein a metal member is provided at a position separated from an end of the coil and an end of the core by at least 10 mm.

3. The reactor structure according to claim 1, wherein the core includes a plurality of core members, and the core is retained by the resin mold member in the state in which ends of the plurality of core members abut on each other.

4. The reactor structure according to claim 1, wherein the core is formed by a dust core.

5. The reactor structure according to claim 4, wherein the dust core is Sendust.

6. A reactor structure comprising a core wound by a coil, wherein a winding cooling portion for cooling the coil is in contact with a cooler via a coil cooling member formed by non-fluid material, a core cooling portion for cooling the core is in contact with the cooler via a core cooling member formed by a non-fluid material, a resin mold member covering the coil and the core retains the coil and the core and fixes the coil and the core to the cooler, a drive frequency of a power conversion device in which the reactor structure is used is 1 kHz or higher, the core is formed by a dust core, and a second inductance value of the reactor structure at drive frequencies from 1,000 Hz to 100,000 Hz is within 0.98 of a first inductance value at 100 Hz.

7. The reactor structure according to claim 1, the reactor structure being configured as a magnetically coupled reactor in which a plurality of the coils are differentially connected so that magnetic fluxes generated from the respective coils are canceled out.

8. The reactor structure according to claim 2, wherein the core includes a plurality of core members, and the core is retained by the resin mold member in the state in which ends of the plurality of core members abut on each other.

9. The reactor structure according to claim 2, wherein the core is formed by a dust core.

10. The reactor structure according to claim 3, wherein the core is formed by a dust core.

11. The reactor structure according to claim 8, wherein the core is formed by a dust core.

12. The reactor structure according to claim 9, wherein the dust core is Sendust.

13. The reactor structure according to claim 10, wherein the dust core is Sendust.

14. The reactor structure according to claim 6, wherein the dust core is Sendust.

15. The reactor structure according to claim 2, wherein drive frequency of a power conversion device in which the reactor structure is used is 1 kHz or higher.

16. The reactor structure according to claim 3, wherein drive frequency of a power conversion device in which the reactor structure is used is 1 kHz or higher.

17. The reactor structure according to claim 4, wherein drive frequency of a power conversion device in which the reactor structure is used is 1 kHz or higher.

18. The reactor structure according to claim 5, wherein drive frequency of a power conversion device in which the reactor structure is used is 1 kHz or higher.

19. The reactor structure according to claim 8, wherein drive frequency of a power conversion device in which the reactor structure is used is 1 kHz or higher.

20. The reactor structure according to claim 9, wherein drive frequency of a power conversion device in which the reactor structure is used is 1 kHz or higher.

21. The reactor structure according to claim 1, wherein the winding cooling portion comprises a first winding cooling portion provided at an upper surface of the coil and a second winding cooling portion provided at a bottom surface of the coil.

* * * * *